(12) United States Patent
Ishida et al.

(10) Patent No.: US 10,978,108 B2
(45) Date of Patent: Apr. 13, 2021

(54) APPARATUS, METHOD, AND PROGRAM FOR CREATING A VIDEO WORK

(71) Applicant: Hurray3 Inc., Tokyo (JP)

(72) Inventors: Mitsugu Ishida, Tokyo (JP); Satoru Aoki, Tokyo (JP)

(73) Assignee: Hurray3 Inc., Tokyo (JP)

( * ) Notice: Subject to any disclaimer, the term of this patent is extended or adjusted under 35 U.S.C. 154(b) by 0 days.

(21) Appl. No.: 16/382,849

(22) Filed: Apr. 12, 2019

(65) Prior Publication Data

US 2019/0318764 A1 Oct. 17, 2019

(30) Foreign Application Priority Data

Apr. 12, 2018 (JP) .............................. JP2018-076762

(51) Int. Cl.
*G11B 27/036* (2006.01)
(52) U.S. Cl.
CPC .................................. *G11B 27/036* (2013.01)
(58) Field of Classification Search
CPC ............................ G11B 27/036; G11B 27/031
USPC ................................. 386/282, 290; 715/726
See application file for complete search history.

(56) References Cited

U.S. PATENT DOCUMENTS

2005/0134946 A1\* 6/2005 Tsue ........................ G06T 11/60
358/537
2010/0050083 A1\* 2/2010 Axen ................... G11B 27/031
715/726

\* cited by examiner

*Primary Examiner* — Girumsew Wendmagegn
(74) *Attorney, Agent, or Firm* — Wolf, Greenfield & Sacks, P.C.

(57) ABSTRACT

A video work creating apparatus according to an embodiment of the invention includes: a template selection receiving unit that receives selection of a template to be applied to a video work to be created from among a plurality of templates; a shot video segment registration unit that registers each of a plurality of shot video segments corresponding to a plurality of scenes included in the selected templates; and a video work creating unit that creates a video work based on the registered plurality of shot video segments, the shot video segment registration unit being configured to register, if the selected template has a reference scene that refers to a scene included in another template as a scene-to-be-referred-to, a shot video segment corresponding to the scene-to-be-referred-to which has been registered to create another video work to which the other template is applied, as a shot video segment corresponding to the reference scene included in the selected template.

4 Claims, 13 Drawing Sheets

APPARATUS, METHOD, AND PROGRAM FOR CREATING A VIDEO WORK

CROSS-REFERENCES TO RELATED APPLICATIONS

This application relates to and claims priority from Japanese Patent Application No. 2018-076762, filed on Apr. 12, 2018, the entire disclosure of which is incorporated herein by reference.

BACKGROUND

Field

The present invention relates to an apparatus, a method and a program for creating a video work.

Description of Related Art

An apparatus for creating a video work such as an advertising movie has conventionally been proposed. For example, JP2015-115718 A discloses an apparatus capable of performing scene-by-scene shooting according to a shooting template, thereby making a story movie without an editing process.

However, in the above-mentioned conventional apparatus, although a story video work can be shot easily, new shooting operations are needed every time a video work is created, and even when, for example, a plurality of video works which are similar to each other (e.g., a plurality of video works for advertising a common product) is created, shooting operations are needed for each video work. In this way, the conventional apparatus for creating a video work has room for improvement in terms of efficiency.

SUMMARY

An object of the invention is to support the efficient creation of video works. Other objects of the invention will become apparent with reference to the entire description of this specification.

A video work creating apparatus according to an embodiment of the invention is a video work creating apparatus for creating a video work, the video work creating apparatus including: a template selection receiving unit that receives selection of a template to be applied to a video work to be created from among a plurality of templates; a shot video segment registration unit that registers each of a plurality of shot video segments corresponding to a plurality of scenes included in a selected template; and a video work creating unit that creates a video work based on the registered plurality of shot video segments, the shot video segment registration unit being configured to register, if the selected template has a reference scene that refers to a scene included in another template as a scene-to-be-referred-to, a shot video segment corresponding to the scene-to-be-referred-to which has been registered to create another video work to which the other template is applied, as a shot video segment corresponding to the reference scene included in the selected template.

With such configuration, since it is possible to register a shot video segment which has been registered to create the other video work to which the other template having the scene-to-be-referred-to that is referred to by the reference scene is applied, as the shot video segment corresponding to the reference scene included in the selected template (i.e., it is possible to reuse the shot video segment which has been registered for the other video work), such configuration can facilitate creation of a video work by efficiently utilizing shot video segments.

In the above-mentioned apparatus, the plurality of templates may include a first template having a first predetermined number of scenes and a second template having a second predetermined number of scenes, the second predetermined number being less than the first predetermined number; and the second predetermined number of scenes may be configured as reference scenes that refer to part of the first predetermined number of scenes as scenes-to-be-referred-to, respectively. With such configuration, it is possible to easily create, for example, after creating a video work to which the first template is applied, a new video work having a reduced playback time (a shortened length) with a reduced number of scenes relative to the created video work, by using the second template.

Further, in the above-mentioned apparatus, the plurality of templates may include a first template having a first scene and a second template having a predetermined number of reference scenes that each refer to the first scene as a scene-to-be-referred-to, the predetermined number being two or more; and the shot video segment registration unit may be configured to register, if the selected template is the second template, each of a predetermined number of shot video segments which each correspond to the first scene and which have been registered to create a predetermined number of other video works to which the first template is applied, as shot video segments corresponding to the predetermined number of reference scenes included in the second template. With such configuration, it is possible to easily create, for example, after creating a plurality of video works to which the same first template is applied (e.g., a plurality of video works for advertising different products), a video work (e.g., an advertising movie for collectively advertising a plurality of products) based on the plurality of shot video segments which have each been registered for the plurality of video works, by using the second template.

A video work creating method according to an embodiment of the invention is a video work creating method executed by one or more computers for creating a video work, the method including: receiving selection of a template to be applied to a video work to be created from among a plurality of templates; registering each of a plurality of shot video segments corresponding to a plurality of scenes included in a selected template; and creating a video work based on the registered plurality of shot video segments, in which the registering the shot video segments includes registering, if the selected template has a reference scene that refers to a scene included in another template as a scene-to-be-referred-to, a shot video segment corresponding to the scene-to-be-referred-to which has been registered to create another video work to which the other template is applied, as a shot video segment corresponding to the reference scene included in the selected template.

With such configuration, since it is possible to register a shot video segment which has been registered to create the other video work to which the other template having the scene-to-be-referred-to that is referred to by the reference scene is applied, as the shot video segment corresponding to the reference scene included in the selected template (i.e., it is possible to reuse the shot video segment which has been registered for the other video work), such configuration can facilitate the creation of a video work by efficiently utilizing shot video segments.

A video work creating program according to an embodiment of the invention is a video work creating program for creating a video work, the program causing one or more computers to execute processes including: receiving selection of a template to be applied to a video work to be created from among a plurality of templates; registering each of a plurality of shot video segments corresponding to a plurality of scenes included in a selected template; and creating a video work based on the registered plurality of shot video segments, in which the process of registering the shot video segments includes registering, if the selected template has a reference scene that refers to a scene included in another template as a scene-to-be-referred-to, a shot video segment corresponding to the scene-to-be-referred-to which has been registered to create another video work to which the other template is applied, as a shot video segment corresponding to the reference scene included in the selected template.

With such configuration, since it is possible to register a shot video segment which has been registered to create the other video work to which the other template having the scene-to-be-referred-to that is referred to by the reference scene is applied, as the shot video segment corresponding to the reference scene included in the selected template (i.e., it is possible to reuse the shot video segment which has been registered for the other video work), such configuration can facilitate the creation of a video work by efficiently utilizing shot video segments.

Various embodiments of the invention support the efficient creation of video works.

DETAILED DESCRIPTION

Embodiments of the invention will now be described below with reference to the attached drawings.

Figure 1:
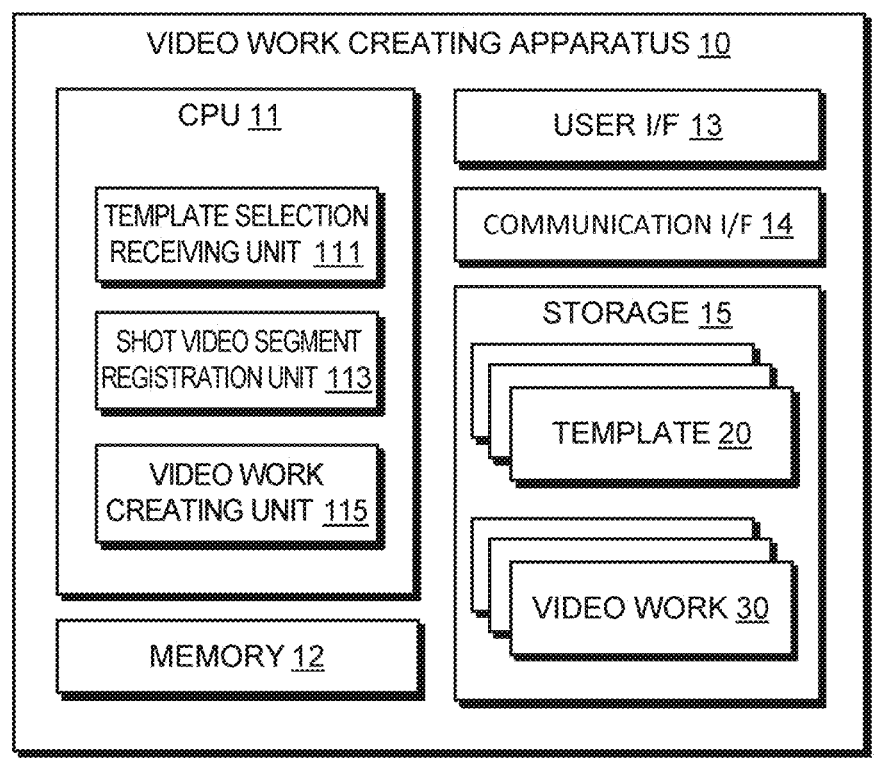
FIG. 1 is a configuration diagram schematically showing a configuration of a video work creating apparatus 10 according to an embodiment of the invention.

FIG. 1 is a configuration diagram schematically showing a configuration of a video work creating apparatus 10 according to an embodiment of the invention. In the present embodiment, the video work creating apparatus 10 has a function for allowing a user to easily create an advertising movie, being a video work, using a template.

The video work creating apparatus 10 has a configuration of a typical computer, which may be constituted as, for example, a smartphone or a tablet terminal. Specifically, as shown in FIG. 1, the video work creating apparatus 10 includes a CPU 11, a main memory 12 which may be a DRAM or the like for temporarily storing data and a program, a user interface 13 that communicates information with a user, a communication interface 14 that controls wired or wireless communication, and a storage 15 which may be a magnetic disk, a flash memory or the like, for storing data and a program. The CPU 11 reads a program stored in the storage 15 into the main memory 12 to execute instructions included in the program.

The user interface 13 may include, for example: an information input device such as a keyboard, a mouse and a touch panel; a sound input device such as a microphone; an image input device such as a camera; an image output device such as a display; and a sound output device such as a speaker. The communication interface 14 is implemented as hardware such as a network adapter, various types of communication software or a combination thereof.

The storage 15 stores various types of information for creating a video work. For example, the storage 15 may store a plurality of templates 20 for creating video works, a plurality of created video works 30, etc.

Figure 2:
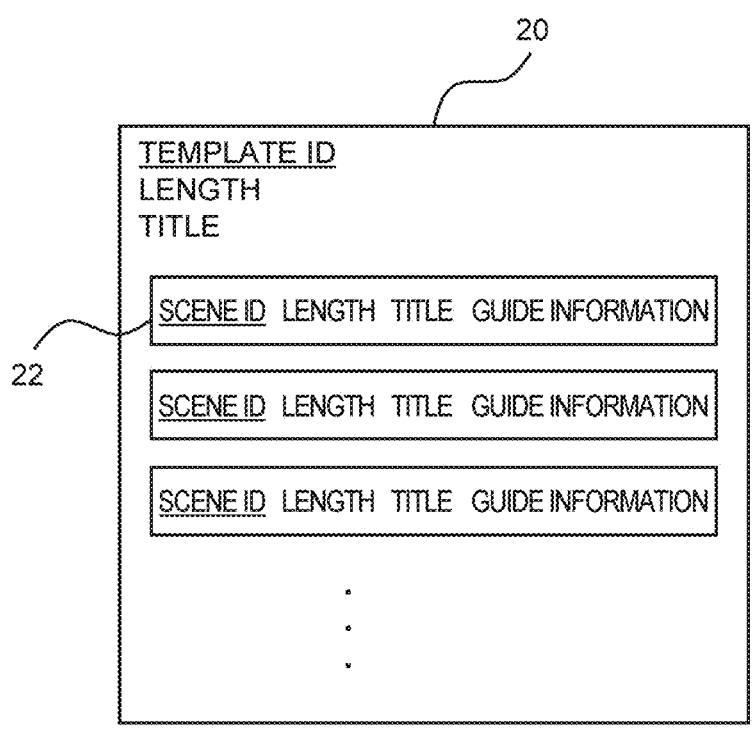
FIG. 2 is a diagram explaining a data structure of a template 20.

FIG. 2 is a diagram explaining a data structure of an individual template 20 stored in the storage 15. As shown in FIG. 2, the template 20 has information such as a "template ID" for identifying an individual template, a "length" indicating a length (playback time) of a video work corresponding to the template and a "title." The template 20 further has a plurality of scenes 22, each scene 22 having a "scene ID" for identifying an individual scene, a "length" (playback time) of a shot video segment corresponding to the scene, a "title" and "guide information." The guide information is information for guiding shooting operations performed by a user and such guide information may include a description of each scene 22 and information related to a composition (such as a position of a subject).

Figure 3:
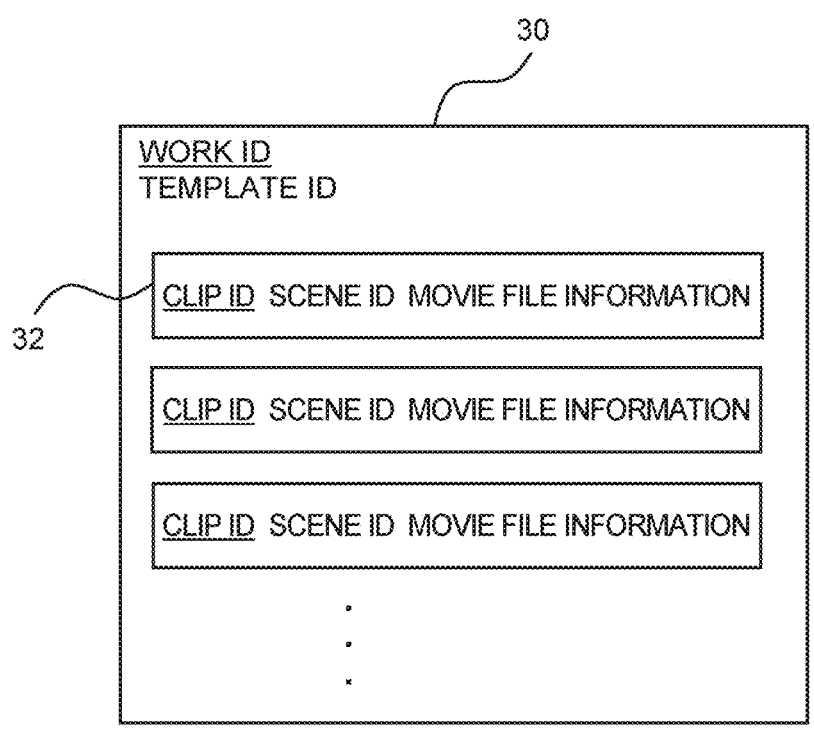
FIG. 3 is a diagram explaining a data structure of a video work 30.

FIG. 3 is a diagram explaining a data structure of an individual video work 30 stored in the storage 15. As shown in FIG. 3, the video work 30 may have information such as a "work ID" for identifying an individual video work and a "template ID" for identifying a template applied to the video work. The video work 30 has a plurality of shot video segments (clips) 32, each shot video segment 32 having information such as a "clip ID" for identifying an individual shot video segment, a "scene ID" for identifying a scene in the template which corresponds to the shot video segment and "movie file information." The movie file information includes information (such as a file name) for specifying a movie file corresponding to each shot video segment.

Upon execution of an instruction included in a program stored in the storage 15, etc. by the CPU, the video work creating apparatus 10 fulfills functions as a template selection receiving unit 111, a shot video segment registration unit 113 and a video work creating unit 115, as shown in FIG. 1. The template selection receiving unit 111 performs various types of processes related to receipt of a template selection. For example, the template selection receiving unit 111 displays, on the video work creating apparatus 10, a screen that allows a desired template to be selected from among a plurality of templates stored in the storage 15, and receives selection of a template from the user via the screen. The shot video segment registration unit 113 performs various processes related to registration of shot video segments. For example, the shot video segment registration unit 113 registers each of a plurality of shot video segments corresponding to a plurality of scenes included in the selected template. The video work creating unit 115 performs various processes related to creation of a video work. For example, the video work creating unit 115 creates a video work based on the registered plurality of shot video segments.

Figure 4:
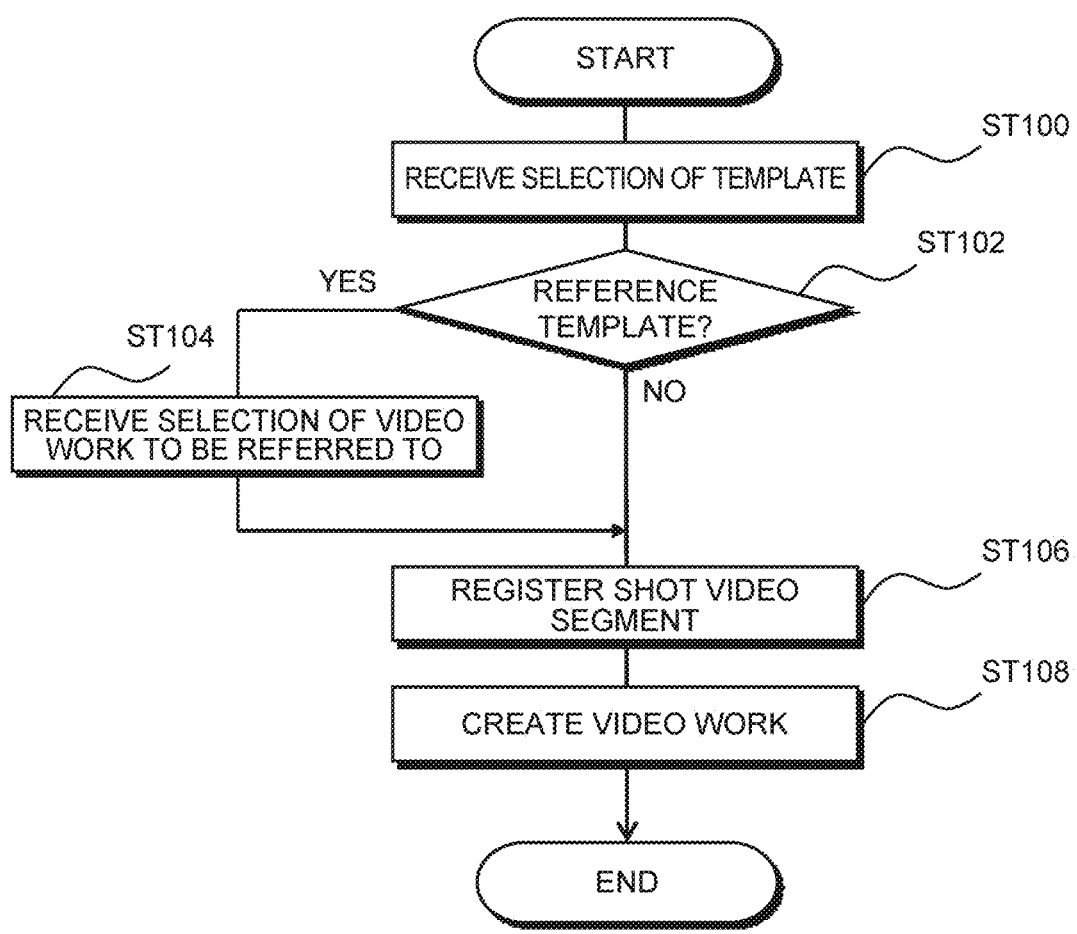
FIG. 4 is a flowchart illustrating processes performed by a video work creating apparatus 10.

The following description will now describe operations of the video work creating apparatus 10 configured as described above according to the present embodiment. FIG. 4 is a flowchart illustrating processes performed by the video work creating apparatus 10 for creating a video work. As shown in FIG. 4, the video work creating apparatus 10 first receives selection of a template by a user (ST100).

Figure 5:
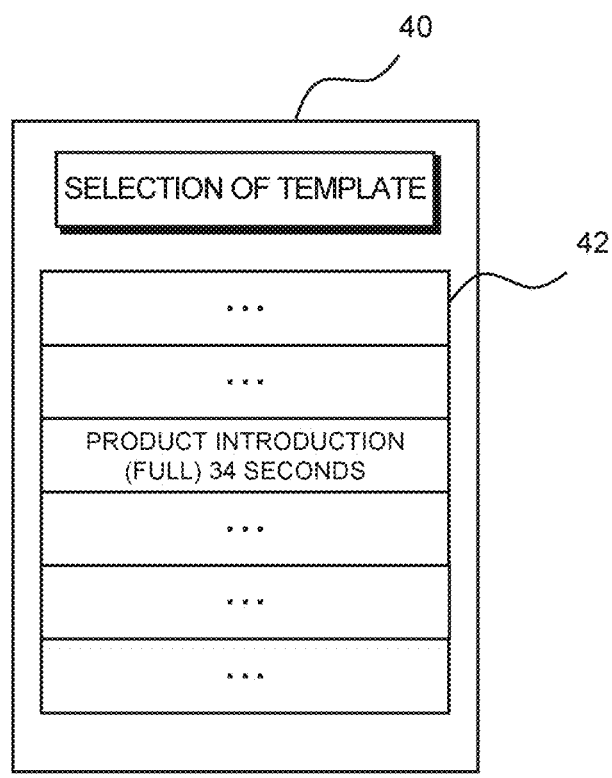
FIG. 5 is a diagram illustrating a template selection screen 40.

FIG. 5 illustrates a template selection screen 40 that allows a user to select a template. As shown in FIG. 5, the screen 40 has a list display region 42 for displaying a list of a plurality of templates. The list display region 42 displays a list of information (a title and a length of each template) related to each of the plurality of templates stored in the storage 15. The user can select a desired template to be applied to a video work via the list display region 42. Templates may be classified into predetermined search categories so that the user can narrow down the templates using the categories in the template selection screen 40.

Upon receiving the selection of the template from the user via the template selection screen 40, the video work creating apparatus 10 then judges whether or not the selected template is a reference template having a reference scene that refers to a scene in another template as a scene-to-be-referred-to (ST102) and, if the selected template is not a reference template and is instead a normal template (ST102; NO), the video work creating apparatus 10 registers a shot video segment (ST106).

Figure 6:
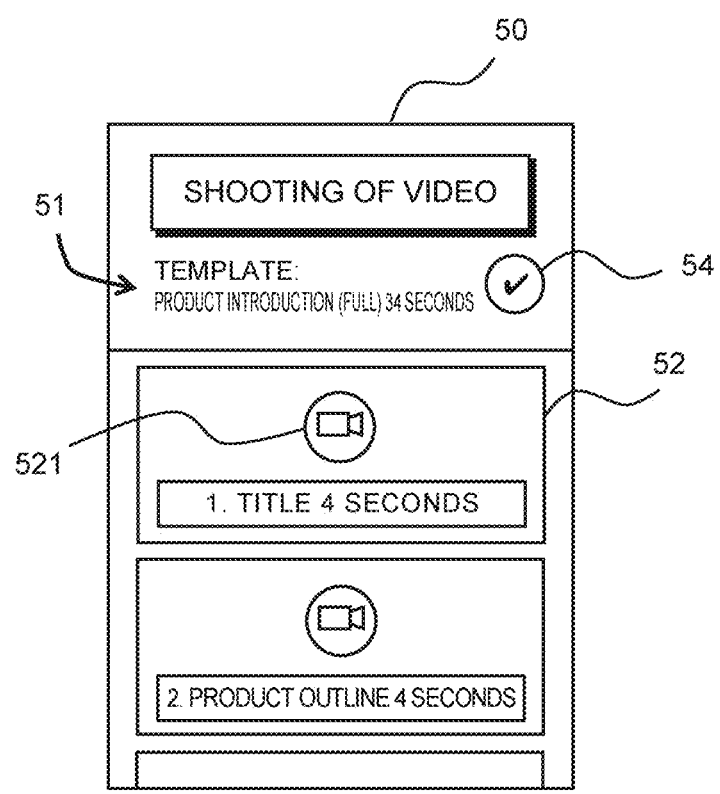
FIG. 6 is a diagram illustrating a shooting screen 50.

FIG. 6 illustrates a shooting screen 50 displayed in place of the template selection screen 40 when a normal template is selected via the list display region 42 in the template selection screen 40. As shown in FIG. 6, the screen 50 includes a template information display region 51 for displaying information related to the selected template, a plurality of scene information display regions 52 for displaying information related to the respective scenes included in the selected templates, and a video work creating object 54.

The plurality of scene information display regions 52 is arranged vertically in accordance with the order of the scenes in the template and the regions 52 to be displayed are switched by a flick operation in a vertical direction, or the like. In each region 52, information (the title and length) of a scene is displayed and a shooting object 521 is arranged. When the object 521 is selected, shooting of a corresponding scene is started. More specifically, after playing back corresponding guide information, the video work creating apparatus 10 shoots and records a video segment having a corresponding length and then registers the shot video segment (movie file) in the storage 15.

Figure 7:
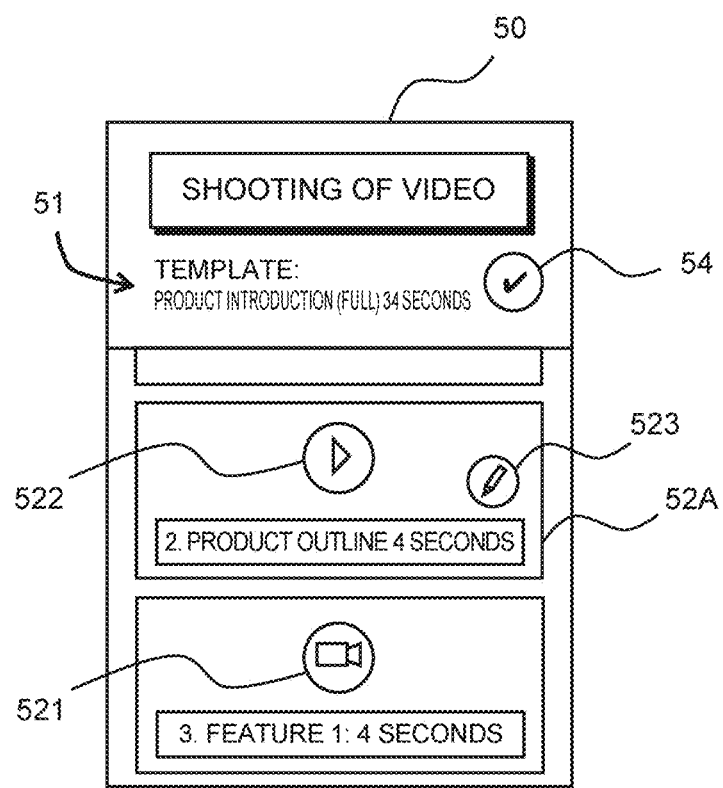
FIG. 7 is a diagram illustrating the shooting screen 50 in another state.

FIG. 7 illustrates the shooting screen 50 in a state where shot video segments corresponding to some scene information display regions 52 have been registered. FIG. 7 shows the screen 50 in a state where a shot video segment corresponding to a scene (titled "2. Product Outline") in a scene information display region 52A has been registered. In this case, a playback object 522 for playing back the registered corresponding shot video segment is arranged in the region 52A, in place of the shooting object 521. Further, an editing object 523 for editing (including deletion of) the registered shot video segment is arranged on the right side of the playback object 522. When the playback object 522 is selected, the registered movie file is played back. When the editing object 523 is selected, a screen for editing the registered movie file is displayed so as to allow the user to edit the movie file via such screen.

The video work creating object 54 becomes selectable when all the shot video segments corresponding to the plurality of scenes included in the selected template have been registered. When the object 54 is selected, the video work creating apparatus 10 creates a video work based on the registered shot video segments (ST108). Specifically, the plurality of shot video segments (movie files) are combined in accordance with the order of the plurality of scenes set in the selected template and automatically edited in accordance with rules set for the selected template. Such automatic editing may include, among others, application of a predetermined filter and addition of background music.

In this way, when a normal template is selected, the user can easily create a video work only by shooting movies in accordance with guide information set for each of the plurality of scenes included in the selected template.

On the other hand, if the selected template is a reference template having a reference scene that refers to a scene in another template as a scene-to-be-referred-to (ST102; YES), the video work creating apparatus 10 receives selection of a video work to be referred to (ST104).

Figure 8:
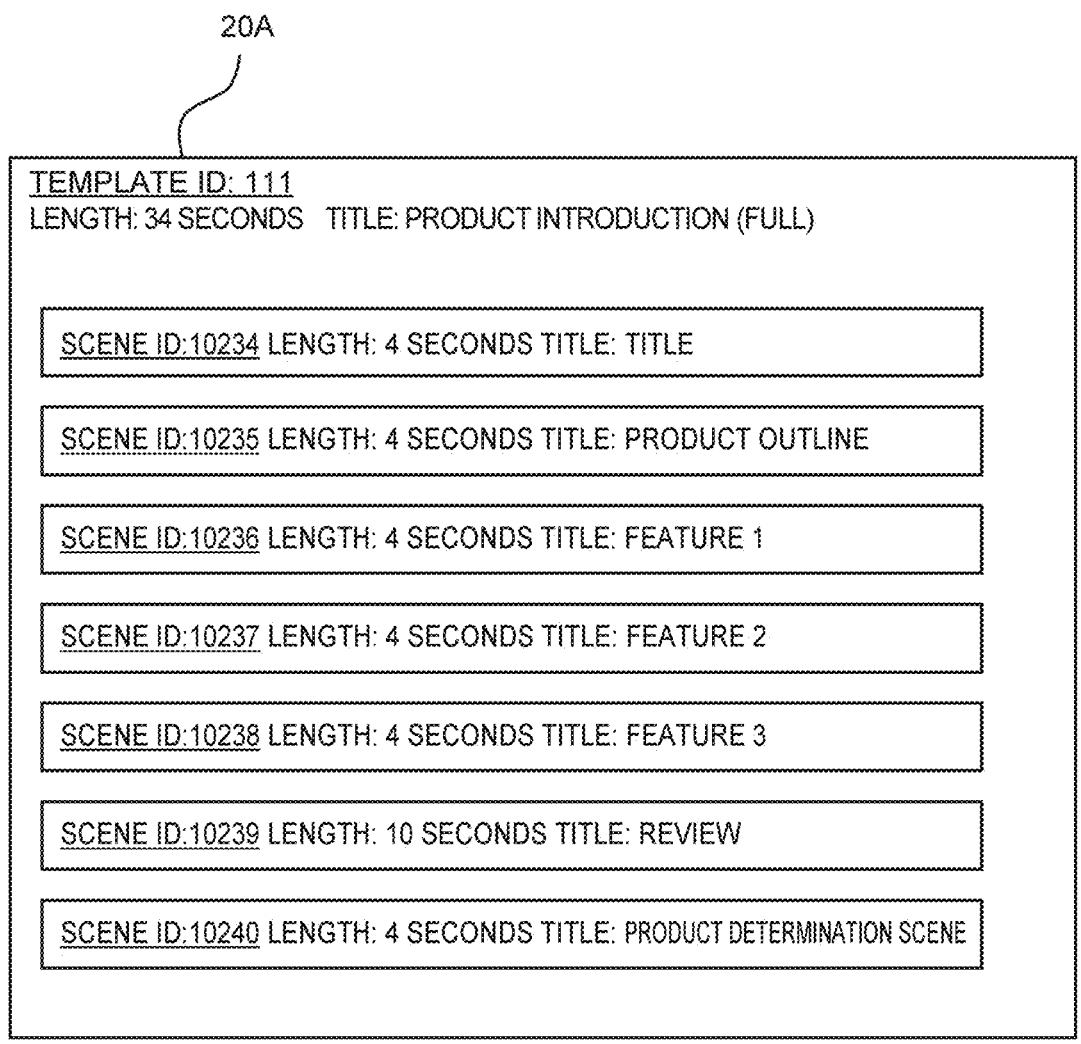
FIG. 8 is a diagram showing a specific example of a data structure of a template 20A.
Figure 9:
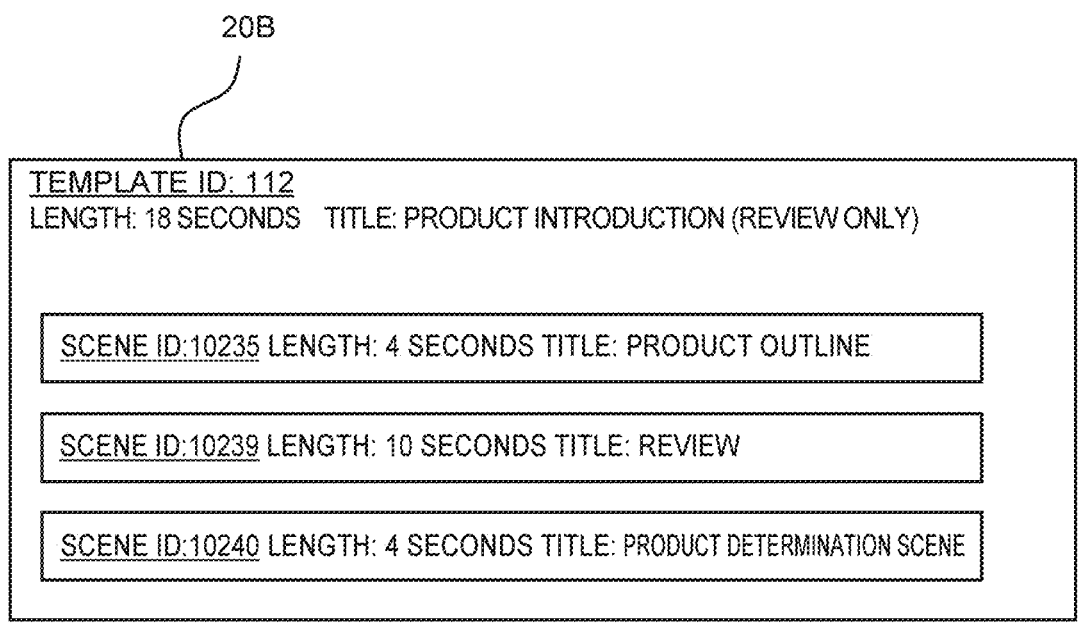
FIG. 9 is a diagram showing a specific example of a data structure of a template 20B which refers to the template 20A.

The following description will describe a specific example of the reference template having a reference scene that refers to a scene included in another template as a scene-to-be-referred-to. FIG. 8 shows a specific example of a data structure of a template 20A, being an example of a normal template having a scene-to-be-referred-to. FIG. 9 shows a specific example of a data structure of a template 20B, being an example of a reference template that refers to the template 20A.

As shown in FIG. 8, the template 20A has a template ID of "111," a length of "34 seconds" and a title of "Product Introduction (Full)." Further, the template 20A has seven scenes. The scene with a scene ID of "10234" has a length of "4 seconds" and a title of "Title." Similarly, the six scenes having IDs of "10235" to "10240," respectively, have titles and lengths of "Product Outline (4 seconds)," "Feature 1 (4 seconds)," "Feature 2 (4 seconds)," "Feature 3 (4 seconds)," "Review (10 seconds)" and "Product Determination Scene (4 seconds)."

As shown in FIG. 9, the template 20B, which is a reference template that refers to the template 20A, has a template ID of "112," a length of "18 seconds" and a title of "Product Introduction (Review Only)." The template 20B further has three reference scenes that respectively refer to three scenes (having the titles of "Product Outline," "Review" and "Product Determination Scene") included in the template 20A in FIG. 8 as the scenes-to-be-referred-to. In the present embodiment, a common scene ID is set to a reference scene and a corresponding scene-to-be-referred-to, thereby defining a reference relationship between the scenes. The template 20B titled "Product Introduction (Review Only)" shown in FIG. 9 is constituted from part of the plurality of scenes included in the template 20A titled "Product Introduction (Full)" shown in FIG. 8 and such template 20B can be considered a template for creating a new video work which has a reduced playback time (shortened length) with a reduced number of scenes relative to the video work to which the template 20A titled "Product Introduction (Full)" is applied.

Figure 10:
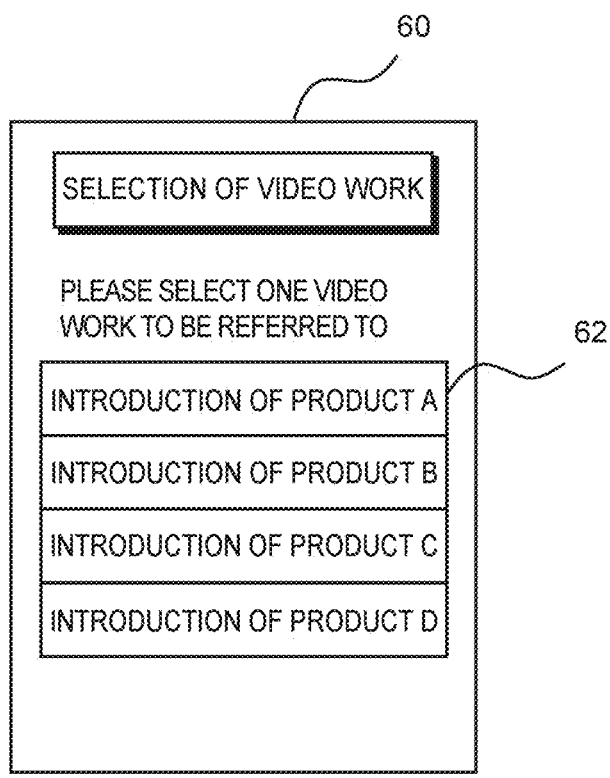
FIG. 10 is a diagram illustrating a video work selection screen 60.

FIG. 10 illustrates a video work selection screen 60 for allowing the user to select a video work to be referred to. The screen 60 is displayed in place of the template selection screen 40 when the reference template is selected via the list display region 42 of the template selection screen 40. As shown in FIG. 10, the video work selection screen 60 has a list display region 62 for displaying a list of one or more video works. The list display region 62 displays a list of information (a title or titles) related to one or more video works to which the other template referred to by the selected reference template is applied. The user can select a video work to be referred to via the list display region 62.

Figure 11:
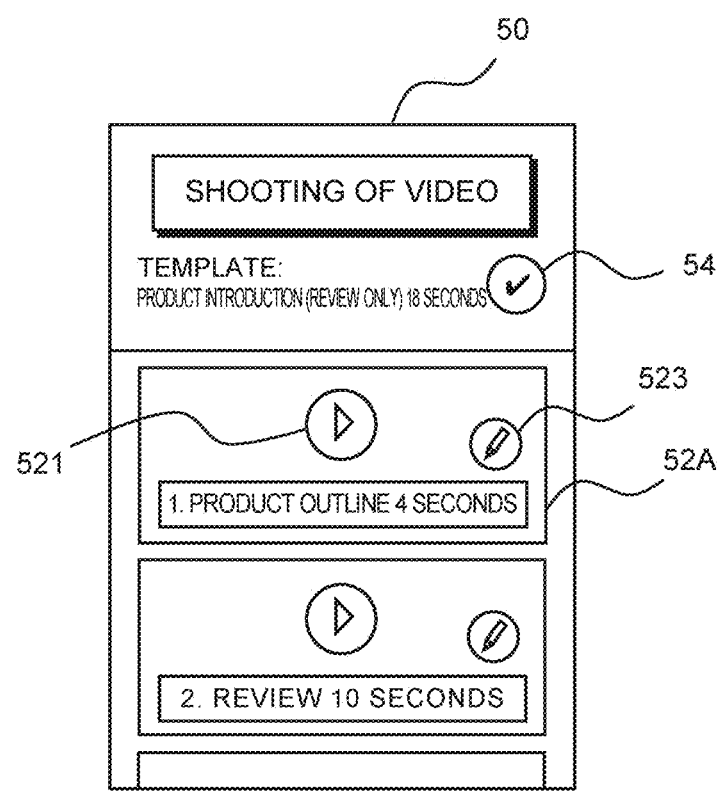
FIG. 11 is a diagram illustrating the shooting screen 50.

Upon receipt of a selection of the video work to be referred to, the process proceeds to registration of a shot video segment (ST106). FIG. 11 illustrates a shooting screen 50 displayed after a video work is selected via the list display region 62 of the video work selection screen 60. If a reference template has been selected, shot video segments (corresponding to the shot video segments corresponding to the scenes-to-be-referred-to) which have already been registered in the video work that is referred to by the selected template are automatically registered as the plurality of shot video segments corresponding to the plurality of scenes included in the selected template. As a result, as shown in FIG. 11, all of the plurality of scene information display regions 52 are turned into the regions 52A, showing the state where the shot video segments have already been registered, in the shooting screen 50. The user can immediately create a video work by selecting the video work creating object 54.

Figure 12:
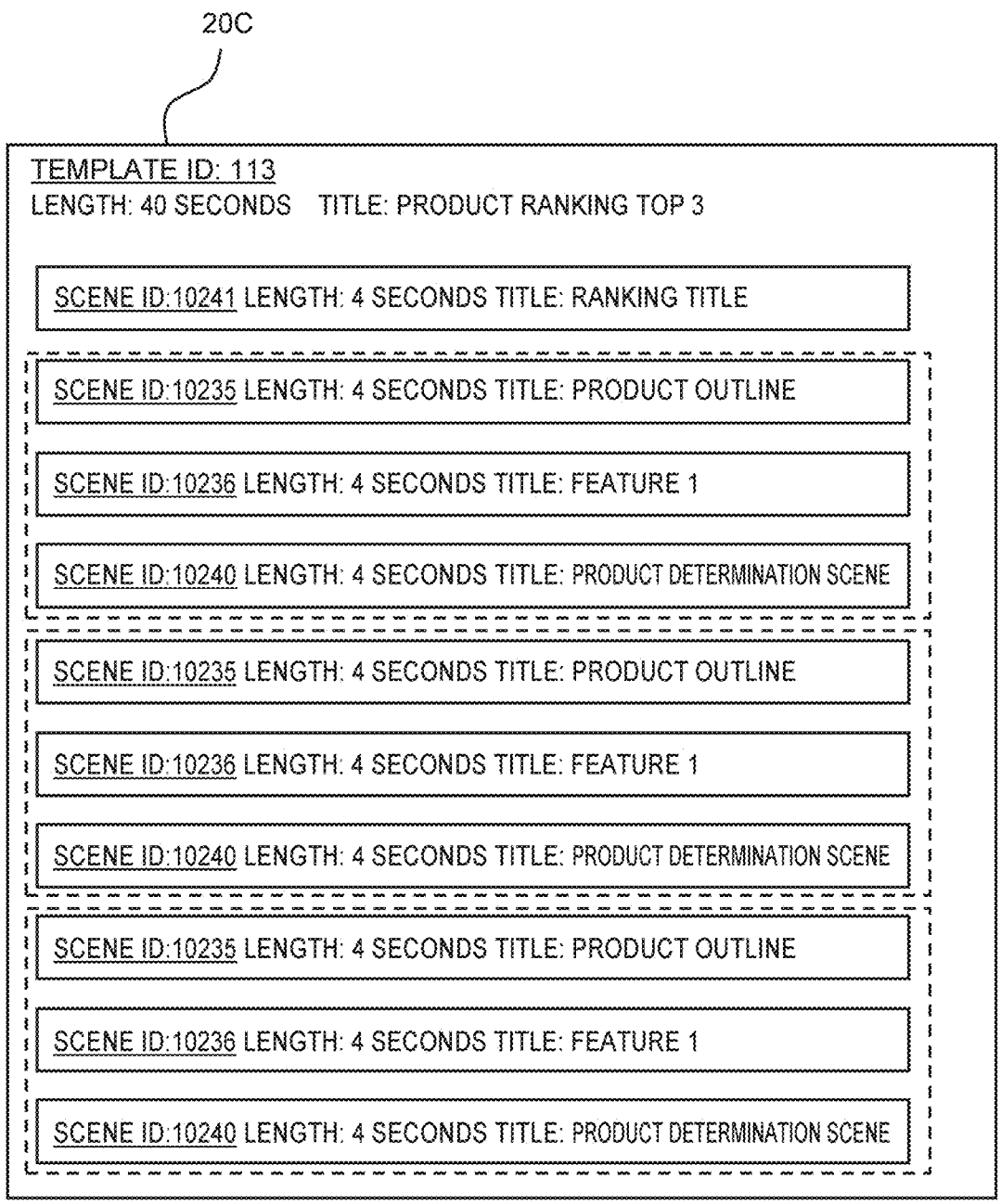
FIG. 12 is a diagram showing a specific example of a data structure of a template 20C.

FIG. 12 illustrates a specific example of a data structure of a template 20C, being another example of the reference template. The template 20C has a plurality of reference scenes that each refer to a common scene-to-be-referred-to included in another template. As shown in FIG. 12, the template 20C has a template ID of "113," a length of "40 seconds" and a title of "Product Ranking Top 3." The template 20C has ten scenes. The scene with the scene ID of "10241" has a length of "4 seconds" and a title of "Ranking Title."

The template 20C also has three sets of three reference scenes (i.e., nine reference scenes) (shown in the dashed rectangles in FIG. 12) that respectively refer to three scenes (the three scenes having the titles of "Product Outline," "Feature 1" and "Product Determination Scene") included in the template 20A (titled "Product Introduction (Full)") shown in FIG. 8 as the scenes-to-be-referred-to.

Figure 13:
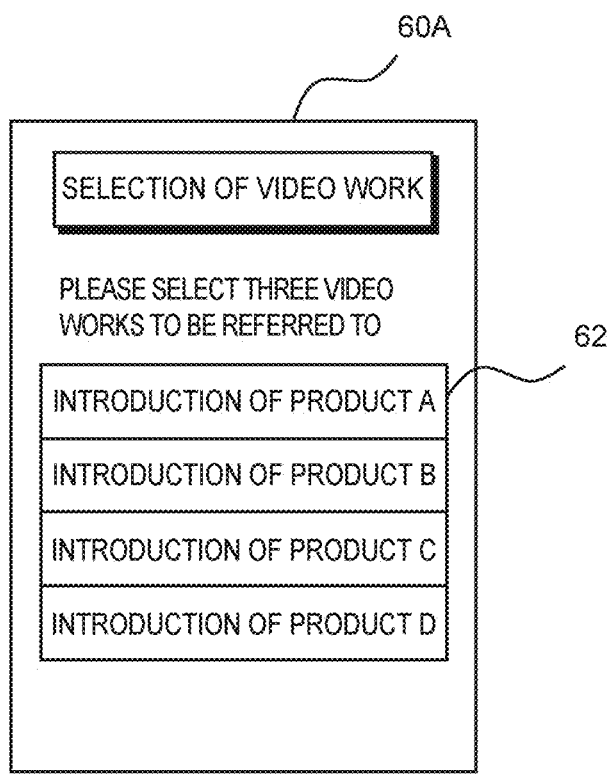
FIG. 13 is a diagram illustrating a video work selection screen 60A.

FIG. 13 illustrates a video work selection screen 60A displayed in place of the template selection screen 40 when the template 20C (titled "Product Ranking TOP 3") shown in FIG. 12 is selected via the template selection screen 40. As shown in FIG. 13, the screen 60A has a list display region 62 for displaying a list of one or more video works, in a similar way to the video work selection screen 60 shown in FIG. 11. The list display region 62 displays a list of information (a title or titles) related to one or more video works to which a template (in the example shown in FIG. 13, the template 20A (titled "Product Introduction (Full)") referred to by the selected reference template is applied. The user can select a video work to be referred to (i.e., the video work whose shot video segment is to be utilized) via the list display region 62. Since the template 20C refers to three video works, the list display region 62 of the screen 60A is configured so that three video works can be selected in a sequential manner.

When the three video works are selected via the list display region 62 of the video work selection screen 60A, three shot video segments which have been registered in each of the three video works that are referred to are automatically registered. A video segment corresponding to the remaining scene (Ranking Title), which is not the reference scene, is shot by the user in accordance with the guide information. The template 20C titled "Product Ranking TOP 3" shown in FIG. 12 has more than one set of reference scenes that refer to a predetermined scene included in the template 20A titled "Product Introduction (Full)" shown in FIG. 8, and such template 20C can be considered a template for creating a new video work based on a plurality of video works to which the template 20A titled "Product Introduction (Full)" is applied.

In the video work creating apparatus 10 according to the present embodiment described above, since a shot video segment which has been registered to create another video work to which another template that includes a scene-to-be-referred-to is applied can be registered as a shot video segment (movie file) corresponding to a reference scene included in a selected template, it is possible to facilitate the creation of a video work by efficiently utilizing shot video segments.

Although the template 20 and the video work 30 are stored in the storage 15 in the video work creating apparatus 10 in the embodiment described above, at least part of the template 20 and the video work 30 may be configured so as to be stored in a cloud storage or the like connected via a network such as the Internet in another embodiment of the invention.

Although the video work creating apparatus 10 is configured as a smartphone, a tablet terminal, or the like, in the embodiment described above, the video work creating apparatus 10 may alternatively be configured as, for example, a server device in another embodiment. Specifically, the video work creating apparatus 10 may be accessed and used by a smartphone, a tablet terminal, or the like, via a predetermined network.

What is claimed is:

1. A video work creating apparatus for creating a video work, comprising:
   a template selection receiving unit that receives selection of a template to be applied to a video work to be created from among a plurality of templates;
   a shot video segment registration unit that registers each of a plurality of shot video segments corresponding to a plurality of scenes included in a selected template;
   a video work creating unit that creates a video work based on the registered plurality of shot video segments,
   wherein the shot video segment registration unit is configured to register, if the selected template has a reference scene that refers to a scene included in another template as a scene-to-be-referred-to, a shot video segment corresponding to the scene-to-be-referred-to which has been registered to create another video work to which the other template is applied, as a shot video segment corresponding to the reference scene included in the selected template, and
   wherein:
   the plurality of templates includes a first template having a first predetermined number of scenes and a second template having a second predetermined number of scenes, the second predetermined number being less than the first predetermined number; and
   the second predetermined number of scenes are configured as reference scenes that refer to part of the first predetermined number of scenes as scenes-to-be-referred-to, respectively.

2. The video work creating apparatus according to claim 1, wherein:
  the plurality of templates includes a first template having a first scene and a second template having a predetermined number of reference scenes that each refer to the first scene as a scene-to-be-referred-to, the predetermined number being two or more; and
  the shot video segment registration unit is configured to register, if the selected template is the second template, each of a predetermined number of shot video segments which each correspond to the first scene and which have been registered to create a predetermined number of other video works to which the first template is applied, as shot video segments corresponding to the predetermined number of reference scenes included in the second template.

3. A video work creating method executed by one or more computers for creating a video work, the method including:
  receiving selection of a template to be applied to a video work to be created from among a plurality of templates;
  registering each of a plurality of shot video segments corresponding to a plurality of scenes included in a selected template;
  creating a video work based on the registered plurality of shot video segments,
  wherein the registering the shot video segments includes registering, if the selected template has a reference scene that refers to a scene included in another template as a scene-to-be-referred-to, a shot video segment corresponding to the scene-to-be-referred-to which has been registered to create another video work to which the other template is applied, as a shot video segment corresponding to the reference scene included in the selected template, and
  wherein:
  the plurality of templates includes a first template having a first predetermined number of scenes and a second template having a second predetermined number of scenes, the second predetermined number being less than the first predetermined number; and
  the second predetermined number of scenes are configured as reference scenes that refer to part of the first predetermined number of scenes as scenes-to-be-referred-to, respectively.

4. A non-transitory recording medium readable by one or more computers that stores a video work creating program for creating a video work, causing the computers to execute processes including:
  receiving selection of a template to be applied to a video work to be created from among a plurality of templates;
  registering each of a plurality of shot video segments corresponding to a plurality of scenes included in a selected template;
  creating a video work based on the registered plurality of shot video segments,
  wherein the process of registering the shot video segments comprises registering, if the selected template has a reference scene that refers to a scene included in another template as a scene-to-be-referred-to, a shot video segment corresponding to the scene-to-be-referred-to which has been registered to create another video work to which the other template is applied, as a shot video segment corresponding to the reference scene included in the selected template, and
  wherein:
  the plurality of templates includes a first template having a first predetermined number of scenes and a second template having a second predetermined number of scenes, the second predetermined number being less than the first predetermined number; and
  the second predetermined number of scenes are configured as reference scenes that refer to part of the first predetermined number of scenes as scenes-to-be-referred-to, respectively.

* * * * *